US012649427B2

(12) United States Patent
Yang et al.

(10) Patent No.: US 12,649,427 B2
(45) Date of Patent: Jun. 9, 2026

(54) SYSTEM AND METHOD FOR PROVIDING COMMUNICATION BETWEEN DEVICES OF VEHICLE USING INTRA-VEHICULAR NETWORK

(71) Applicant: Quasistatics Inc., West Lafayette, IN (US)

(72) Inventors: David Yang, West Lafayette, IN (US); Shreyas Sen, West Lafayette, IN (US); Shovan Maity, West Lafayette, IN (US)

(73) Assignee: Quasistatics Inc., West Lafayette, IN (US)

( * ) Notice: Subject to any disclaimer, the term of this patent is extended or adjusted under 35 U.S.C. 154(b) by 82 days.

(21) Appl. No.: 18/936,233

(22) Filed: Nov. 4, 2024

(65) Prior Publication Data

US 2026/0125006 A1 May 7, 2026

(51) Int. Cl.
*B60R 16/023* (2006.01)
*H04B 5/70* (2024.01)

(52) U.S. Cl.
CPC ............. *B60R 16/023* (2013.01); *H04B 5/70* (2024.01)

(58) Field of Classification Search
CPC ................................ B60R 16/023; H04B 5/07
USPC ......................................... 340/2.1
See application file for complete search history.

(56) References Cited

U.S. PATENT DOCUMENTS

| | | | | |
|---|---|---|---|---|
| 10,140,784 B1* | 11/2018 | Philosof | ................. | G08G 1/163 |
| 2005/0021199 A1* | 1/2005 | Zimmerman | .......... | G06Q 10/10 |
| | | | | 701/1 |
| 2017/0359267 A1* | 12/2017 | Katar | .................... | H04L 1/0078 |
| 2020/0196120 A1 | 6/2020 | Uchiyama | | |
| 2020/0294401 A1 | 9/2020 | Kerecsen | | |
| 2021/0258080 A1* | 8/2021 | Sen | ...................... | H04B 13/005 |
| 2023/0179308 A1 | 6/2023 | Sen et al. | | |

* cited by examiner

*Primary Examiner* — Omar Casillashernandez
(74) *Attorney, Agent, or Firm* — Kevin J Fournier Intellectual Property Legal Services Ltd; Kevin J Fournier

(57) ABSTRACT

A communication system and method for providing communication between one or more physical devices of a vehicle using an intra-vehicular network is disclosed. The system includes a conductive medium, and a processor. The conductive medium includes a plurality of signal conductors, and floating reference/ground conductors. Plurality of signal conductors configured with an Electro-Quasistatic (EQS) field generate an Electro-Quasistatic (EQS) signal from a source device. The plurality of signal conductors configured to forward the generated EQS signal to a destination device via the conductive medium using the EQS field. Further, the floating reference/ground conductors are configured outside the conductive medium to receive the forwarded EQS signal from the source device via the EQS field. The floating reference/ground conductors configured to establish a communication channel between the source device and the destination device. Furthermore, the processor is configured to select a mode of communication between the source device and the destination device.

20 Claims, 10 Drawing Sheets

100

102

300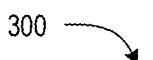

| | TRADITIONAL COMMUNICATION MODES | |
|---|---|---|
| | CAN NETWORK WIRED | RADIO NETWORK WIRELESS (RADIATIVE) |
| | DEVICE A ↔ DEVICE B | DEVICE A ↔ DEVICE B |
| QUASI-STATIC CIRCUIT MODEL APPROXIMATION<br><br>λ >> 5 m | CAPACITIVE RETURN PATH MODES | |
| | IN-VEHICLE EXCITATION: (NON-RADIATIVE) WIRELESS<br><br>DE VI CE B<br>C RETURN<br>C RETURN<br><br>FORWARD PATH CONFIRMED AROUND SAR | OUT-OF-VEHICLE EXCITATION: (NON-RADIATIVE) WIRELESS<br><br>DE VI CE B<br>C RETURN<br>C RETURN<br><br>FORWARD PATH CONFIRMED AROUND SAR |
| WAVELENGTH MODEL<br><br>λ ≅ 5 m | WAVEGUIDE COMMUNICATION MODES | |
| | WAVELENGTH MODE: (NON-RADIATIVE) WIRELESS<br><br>FORWARDS WAVE BUILD | |

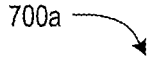
PROPOSED EXCITATION SETUP
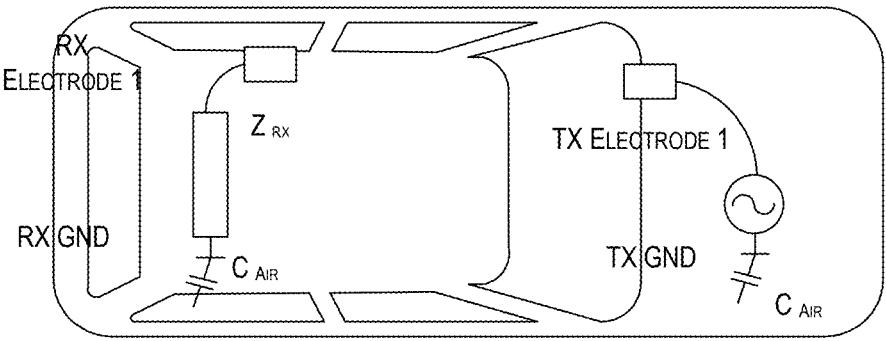
$C_{AIR}$ ARE PARASITIC CAPACITANCES
f < 10MHz
SIMPLIFIED CIRCUIT MODEL
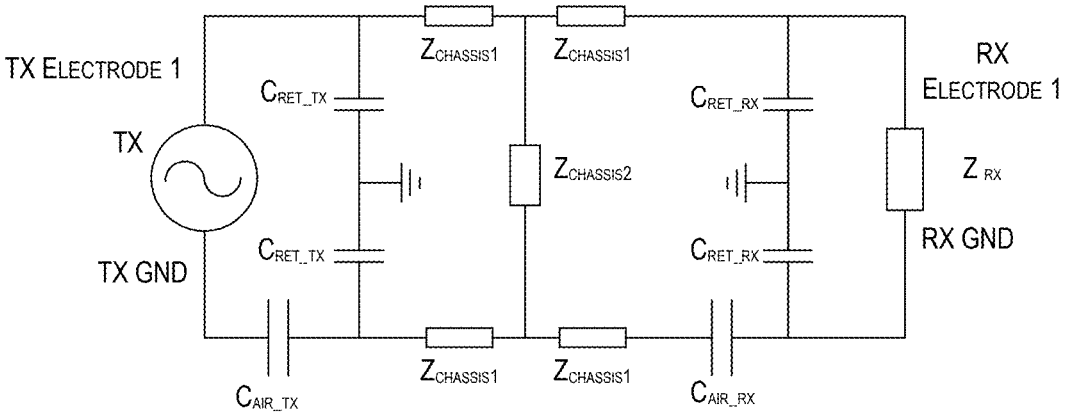
FIG. 7A

PROPOSED EXCITATION SETUP
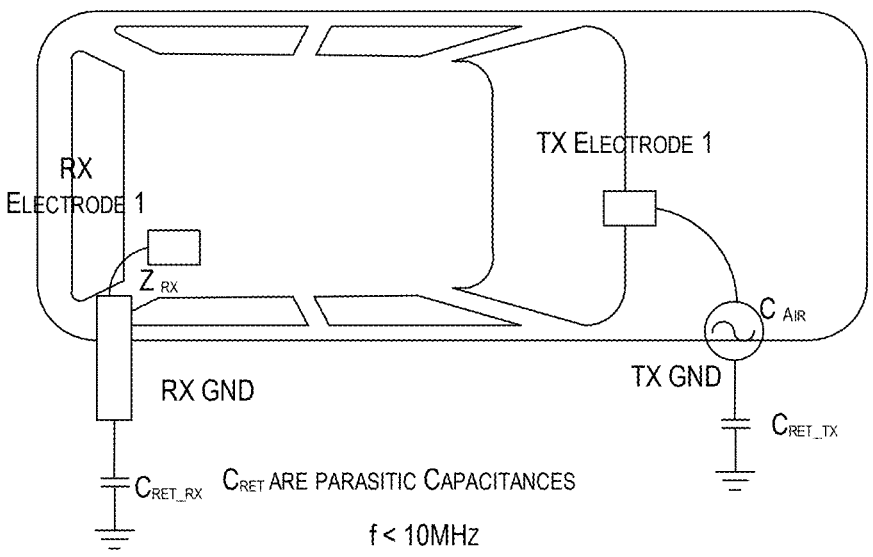
$C_{RET}$ ARE PARASITIC CAPACITANCES
$f < 10MHz$
SIMPLIFIED CIRCUIT MODEL
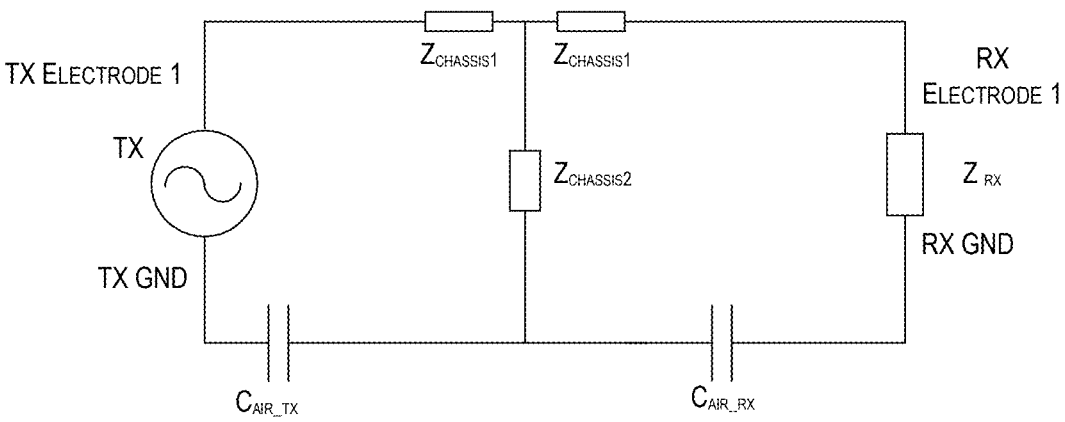
FIG. 7B

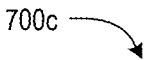
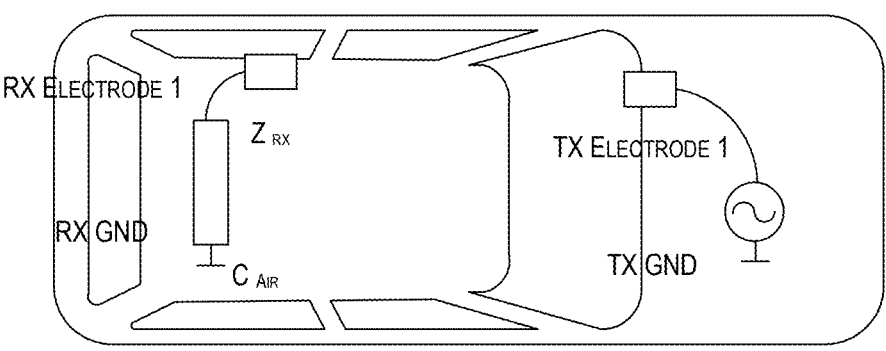
PROPOSED EXCITATION SETUP
f <= 80MHz
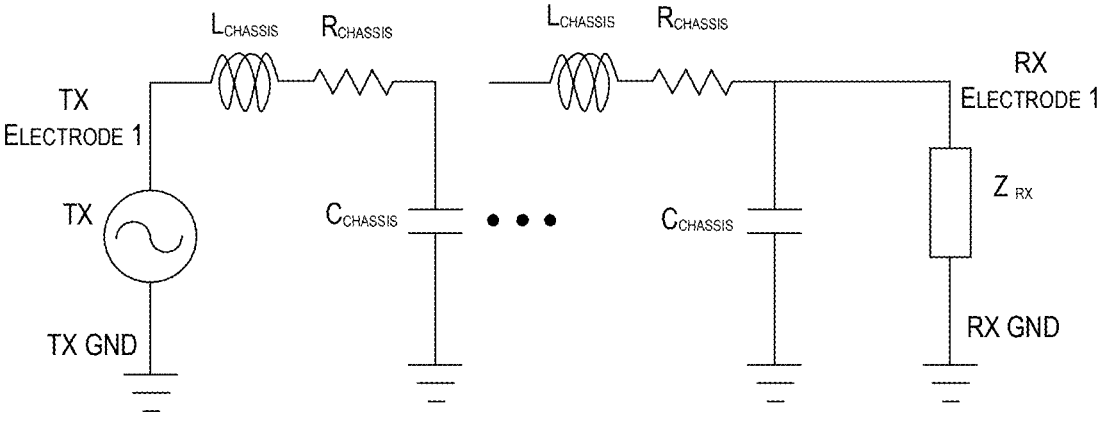
SIMPLIFIED CIRCUIT MODEL
FIG. 7C

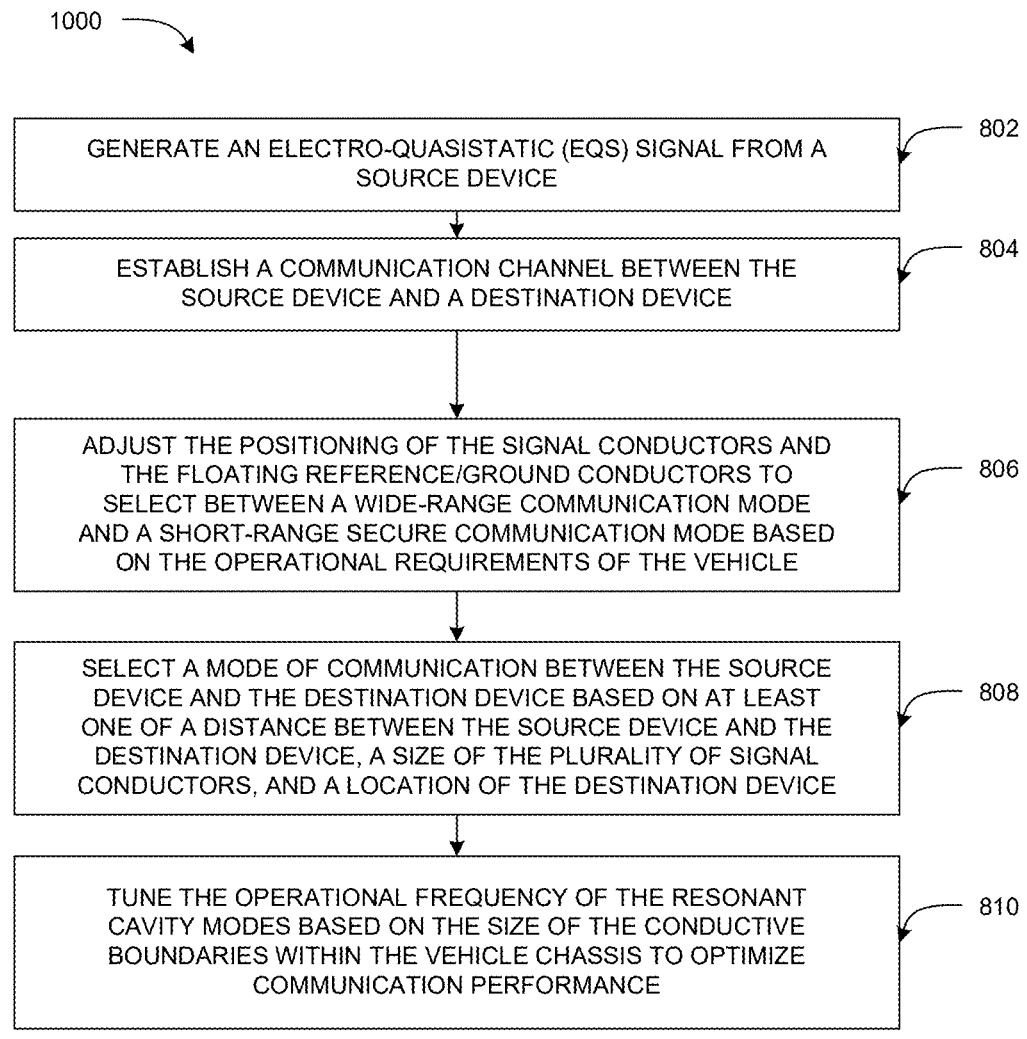

1000

GENERATE AN ELECTRO-QUASISTATIC (EQS) SIGNAL FROM A SOURCE DEVICE — 802

ESTABLISH A COMMUNICATION CHANNEL BETWEEN THE SOURCE DEVICE AND A DESTINATION DEVICE — 804

ADJUST THE POSITIONING OF THE SIGNAL CONDUCTORS AND THE FLOATING REFERENCE/GROUND CONDUCTORS TO SELECT BETWEEN A WIDE-RANGE COMMUNICATION MODE AND A SHORT-RANGE SECURE COMMUNICATION MODE BASED ON THE OPERATIONAL REQUIREMENTS OF THE VEHICLE — 806

SELECT A MODE OF COMMUNICATION BETWEEN THE SOURCE DEVICE AND THE DESTINATION DEVICE BASED ON AT LEAST ONE OF A DISTANCE BETWEEN THE SOURCE DEVICE AND THE DESTINATION DEVICE, A SIZE OF THE PLURALITY OF SIGNAL CONDUCTORS, AND A LOCATION OF THE DESTINATION DEVICE — 808

TUNE THE OPERATIONAL FREQUENCY OF THE RESONANT CAVITY MODES BASED ON THE SIZE OF THE CONDUCTIVE BOUNDARIES WITHIN THE VEHICLE CHASSIS TO OPTIMIZE COMMUNICATION PERFORMANCE — 810

FIG. 8

SYSTEM AND METHOD FOR PROVIDING COMMUNICATION BETWEEN DEVICES OF VEHICLE USING INTRA-VEHICULAR NETWORK

FIELD OF INVENTION

Embodiments of the present disclosure relate to the field of wireless communication system and more particularly relates to a system and method for providing communication between devices of vehicle using an intra-vehicular network.

BACKGROUND

In traditional wireless communication systems, data transmission predominantly relies on radio frequency (RF) electromagnetic (EM) radiation. RF EM methods have been optimized for efficient data transfer through air, offering significant advantages in free-space applications. However, when RF EM waves interact with mediums densely packed with conductors—such as the chassis of a vehicle, aircraft, or ship—these methods encounter substantial channel losses. Additionally, RF EM waves radiate indiscriminately, making the signals vulnerable to interception, which could pose security risks in sensitive applications.

Some prior arts illustrate the potential of EQS communication for human applications, such as EQS-based data transfer for wearable devices, but do not extend these concepts to vehicles, aircraft, or maritime settings where ground-isolated communication is essential.

Other prior arts explore quasi-static communication using magnetic fields rather than electric fields. These solutions rely on magnetic quasi-static fields with near-zero electric field variation, distinguishing them from EQS-based systems, which operate primarily with electric fields and negligible magnetic interference.

Additional prior arts describe vehicle-to-everything (V2X) communication systems for data transfer between vehicles and surrounding infrastructure, leveraging internet-based or RF EM-based techniques to facilitate inter-vehicle communication. However, these methods focus primarily on inter-vehicle communication and external data collection. They do not address the need for secure, efficient, and low-loss intra-vehicle communication, nor do they employ near-field techniques tailored to confined, conductive environments within vehicles.

The need for a secure, low-loss communication channel within confined conductive spaces remains unmet by existing wireless communication technologies, particularly within the automotive, maritime, and aviation industries.

Hence, there is a need for an advanced to a communication system for providing communication between physical devices of vehicle using an intra-vehicular network, in order to address the aforementioned issues.

SUMMARY

This summary is provided to introduce a selection of concepts, in a simple manner which is further described in the detailed description of the disclosure. This summary is neither intended to identify key or essential inventive concepts of the subject matter nor to determine the scope of the disclosure.

In accordance with an embodiment of the present disclosure, a communication system for providing communication between one or more physical devices of a vehicle using an intra-vehicular network is disclosed. The communication system includes a conductive medium, and a processor. Further, the conductive medium includes a plurality of signal conductors, and floating reference/ground conductors. Further, the plurality of signal conductors are configured with an Electro-Quasistatic (EQS) field to generate an Electro-Quasistatic (EQS) signal from a source device. Further, the plurality of signal conductors are configured to forward the generated EQS signal to a destination device via the conductive medium using the EQS field.

Further, the floating reference/ground conductors are configured outside the conductive medium to receive the forwarded EQS signal from the source device via the EQS field. Further, the floating reference/ground conductors are configured to establish a communication channel between the source device and the destination device. Further, the processor is configured to adjust the positioning of the signal conductors and the floating reference/ground conductors to select between a wide-range communication mode and a short-range secure communication mode based on the operational requirements of the vehicle. Further, the processor is configured to select a mode of communication between the source device and the destination device based on at least one of a distance between the source device and the destination device, a size of the plurality of signal conductors, and a location of the destination device. The modes are selectively activated based on the dimensions of the vehicle chassis to optimize a communication frequency and minimize voltage loss within the vehicle. Further, the processor is configured to tune the operational frequency of the resonant cavity modes based on the size of the conductive boundaries within the vehicle chassis to optimize communication performance.

Further, in another aspect of the embodiment of the present disclosure the communication system includes a method for providing communication between one or more physical devices of a vehicle using an intra-vehicular network. The method includes generating, by a plurality of signal conductors, an Electro-Quasistatic (EQS) signal from a source device. Further, the method includes establishing, by a conductive medium, a communication channel between the source device and a destination device. Further, the method includes adjusting, by the processor, the positioning of the signal conductors and the floating reference/ground conductors to select between a wide-range communication mode and a short-range secure communication mode based on the operational requirements of the vehicle. Further, the method includes selecting, by the processor, a mode of communication between the source device and the destination device based on at least one of a distance between the source device and the destination device, a size of the plurality of signal conductors, and a location of the destination device. The modes are selectively activated based on the dimensions of the vehicle chassis to optimize a communication frequency and minimize voltage loss within the vehicle. Further, the method includes tuning, by the processor, the operational frequency of the resonant cavity modes based on the size of the conductive boundaries within the vehicle chassis to optimize communication performance.

BRIEF DESCRIPTION OF DRAWINGS

The disclosure will be described and explained with additional specificity and detail with the accompanying figures in which:

FIG. 3 illustrates an exemplary comparison between EQS and waveguide modes versus traditional communication medium in vehicle, in accordance with another embodiment of the present disclosure;

FIGS. 7A-7C illustrate an exemplary circuit diagram representation of EQS in-vehicle galvanic/bi-phasic inspired modes, capacitive return path mode, and resonant cavity Mode, in accordance with an embodiment of the present disclosure; and FIG. 8 illustrates a process flow diagram of an exemplary a method for providing communication between one or more physical devices of a vehicle using an intra-vehicular network, in accordance with another embodiment of the present disclosure.

Figure 1:
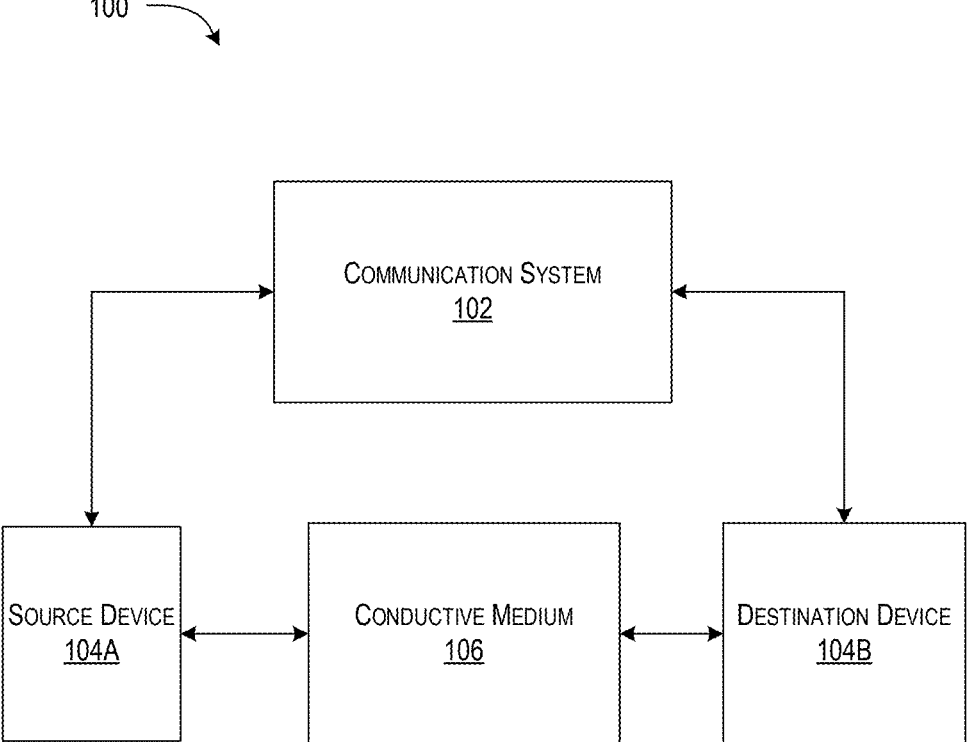
FIG. 1 illustrates a schematic diagram representation of an exemplary communication system for providing communication between one or more physical devices of a vehicle using an intra-vehicular network, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) is configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

To address the above mentioned challenges, electro-quasistatic (EQS) and resonant cavity wave-based communication systems have been proposed as promising alternatives. These techniques utilize conductive surfaces, such as vehicle or ship chassis, to create a communication channel that minimizes signal loss and energy consumption while enhancing security. Unlike RF EM waves, EQS-based communication uses a confined electric field to enable secure, low-loss data exchange between devices, reducing exposure to external interference. This becomes increasingly valuable as vehicle and aircraft designs continue to reduce in size, making physical tethered communication networks, like Controller Area Networks (CAN), challenging to implement effectively.

Referring now to the drawings, and more particularly to FIG. 1 through FIG. 8, where similar reference characters denote corresponding features consistently throughout the figures, there are shown preferred embodiments and these embodiments are described in the context of the following exemplary system and/or method.

FIG. 1 illustrates a schematic diagram 100 representation of an exemplary communication system 102 for providing communication between one or more physical devices of a vehicle using an intra-vehicular network, in accordance with an embodiment of the present disclosure.

According to FIG. 1, the schematic diagram 100 may include, but not limited to, a communication system 102, a source device 104A, a destination device 104B and a conductive medium 106. Further, the communication system 102 may include, but not limited to Electronic Control Units (ECUs), vehicle components, control systems, and sensor networks, and the like. Further, the source device 104A and destination device 104B may include, but not limited to, a control system for opening and closing garage door (where control system is source device and the garage door is destination device), and the like. Further, the source device 104A and destination device 104B may include, but not limited to, Infotainment Control Units (ICUs), one or more sensor Nodes, Gateway Controllers, Telematics Control Unit, and the like. Further, the conducting medium 106 may include, but not limited to, a vehicle chassis, aircraft chassis, ship chassis, and the like. In some alternate embodiments, the communication system 102 may be within the source device 104A and the destination device 104B. In such a case, the source device 104A may directly communicate with the destination device 104B using the conducting medium 106.

The source device 102A of a vehicle 100, comprising a first communication module (not shown), wherein the vehicle 100 comprises a conductive medium 106, and wherein the first communication module comprises: a signal conversion unit (not shown) (also referred herein as second EQS transceiver) configured to convert a digital signal associated with the source device 104A into one of an electric field and an electromagnetic wave suitable for transmission via the conductive medium 106. The destination device 104B of the vehicle 100 comprising a second communication module (not shown), wherein the second communication module comprises: a signal reception unit (not shown) (also referred herein as second EQS transceiver) configured to receive a transmitted signal via the conductive medium 106 and convert the received signal into the digital signal associated with the destination device 104B.

The conductive medium 106 comprising a metal chassis of the vehicle 100, wherein the conductive medium 106 enables communication between the first communication module and the second communication module. A detailed view of the communication system 102 is shown in FIG. 2.

Figure 2:
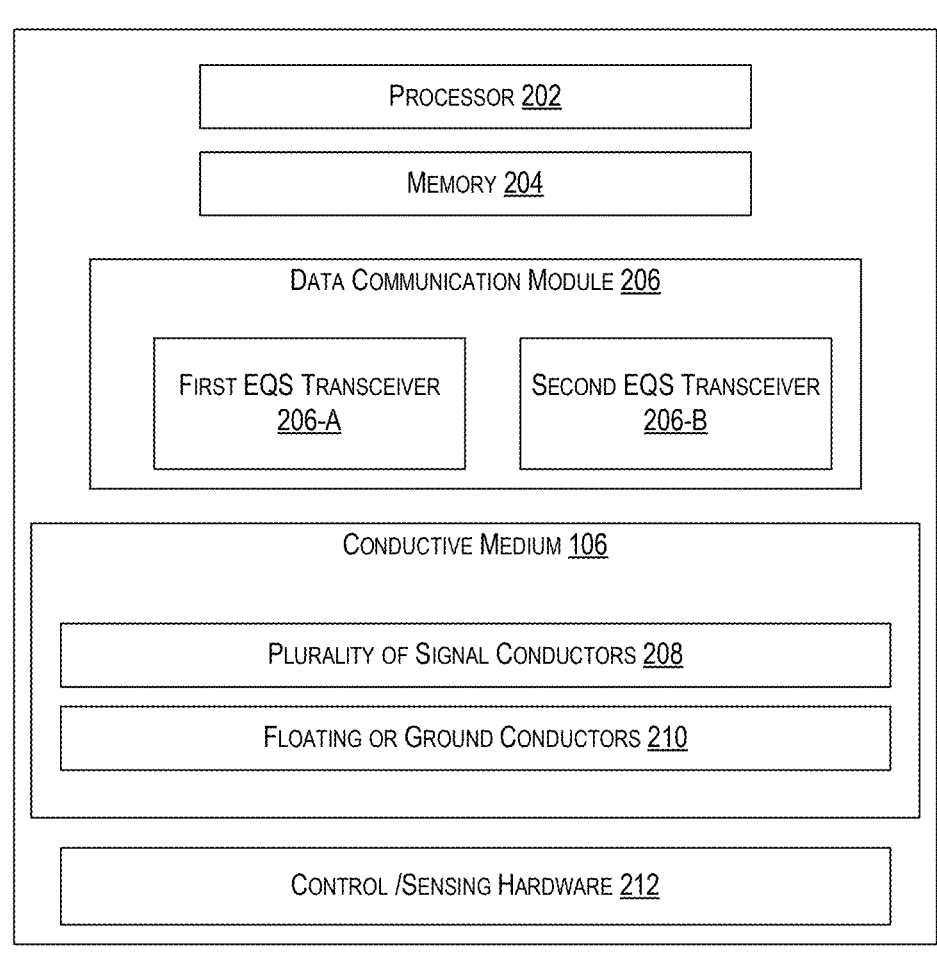
FIG. 2 illustrates a block diagram representation of an exemplary communication system for providing communication between one or more physical devices of a vehicle using an intra-vehicular network, in accordance with another embodiment of the present disclosure.

FIG. 2 illustrates a block diagram representation of an exemplary communication system 102 for providing communication between one or more physical devices of a vehicle using an intra-vehicular network, in accordance with another embodiment of the present disclosure. The communication system 102 may be one of a source device 104A, or a destination device 104B as shown in FIG. 1. Further, the communication system 102 may include one or more hardware processors 202, a memory 204 coupled to the one or more hardware processors 202. Further, the memory 204 may include a plurality of modules in the form of programmable instructions executable by the one or more hardware processors 202. Further, the communication system 102 may include, but not limited to Electronic Control Units (ECUs), vehicle components, control systems, and sensor networks, and the like. Further, the source device 104A and the destination device 104B may include, but not limited to, a control system for opening and closing garage door (where control system is source device and the garage door is destination device), and the like. Further, the conducting medium 106 may include, but not limited to a vehicle chassis, a ship chassis, an aircraft chassis, and the like. Further, the conductive medium 106 may include a plurality of signal conductors 208, floating reference/ground conductors 210, and the like. Further, the plurality of signal conductors 208 may be configured with an Electro-Quasistatic (EQS) field generate an Electro-Quasistatic (EQS) signal from a source device 104A. Further, the plurality of signal conductors 208 may be configured to forward the generated EQS signal to a destination device 104B via the conductive medium 106 using the EQS field. Further, the floating reference/ground conductors 210 may be configured outside the conductive medium 106 to receive the forwarded EQS signal from the source device 104A via the EQS field. Further, the floating reference/ground conductors 210 may be configured to establish a communication channel between the source device 104A and the destination device 104B.

Furthermore, the processor 202 may be configured to select a mode of communication between the source device and the destination device based on at least one of a distance between the source device and the destination device, a size of the plurality of signal conductors 208, and a location of the destination device 104B. Further, the communication mode may include at least one of a capacitive return path mode, and a waveguide communication mode. Further, the source device 104A and the destination device 104B may include a EQS-HBC transmitter 206-A and a EQS-HBC receiver 206-B configured to operate at plurality of frequency ranges. Further, the generated EQS signals includes a frequency range of, for example, but not limited to, at least 0.1 MHz to 1 GHz or even more. Further, the he waveguide communication mode may be configured to operate within a frequency range of 0.1 MHz to 10 GHz. Further, the waveguide communication mode generates one of an electric field and a magnetic field for forming a standing wave pattern with a sharp field drop-off beyond the conductive medium 106. Further, the ground plane/floating ground reference 210 is positioned closer to an outer surface of the vehicle chassis. Further, the conductive medium 106 includes at least one of resistive, capacitive, inductive, and combination thereof. Further, the generated EQS fields may use the conductive medium 106 to achieve significantly low channel loss. Further, the forward path may be formed by the conductive chassis itself and the return path may be formed using the floating reference/ground conductors 210 intentionally introduced to the communication system 102 design. Further, the communication methodology enables significant low loss compared to RF EM techniques which rely on self-sustained propagation of electromagnetic waves. Further, the propagating wave-based techniques often falter due to tight packaging of many conductive objects nearby which causes significant losses and reflections. Further, the EQS fields may be confined to a small distance from the surface of the vehicle chassis.

Further, the confinement presents a significant advantage over RF EM techniques as the signal may not be accessed at a significant distance off the chassis as the electric field intensity is too weak to be picked up even with near theoretically sensitive receivers. Further, a precise placement of the plurality of signal conductors 208 and floating reference/ground conductors 210 within the vehicle/ship/aircraft chassis. Further, the conductors play a critical role in controlling the electric field properties that govern wireless communication. Further, by strategically positioning these conductors, the communication system 102 enables the selection of specific electric field characteristics, directly impacting the distance over which communication may occur and safeguarding against inadvertent signal leakage.

Further, in a first scenario, the car chassis may be thought of as a lumped net, of which both devices are connected to with a dead short, in the return path, both devices (transmitter and receiver) connect to the floating ground via return path capacitances. Further, the floating grounds outside the vehicle represents clear path between the devices that exists without significant obstruction from the vehicle chassis. Further, in a second scenario, the return path ground for destination device is often obstructed by some part of the chassis, hence significant direct coupling between the two grounds is not possible. Further, the modes serve as highly efficient wireless communication, further enhancing the performance and reach of the communication system 102. Further, the voltage loss in these modes may only be at locations within the vehicle chassis and hence care must be used when selecting which modes depending on the location of the receiving device (for example car seat vs centre console). The frequency of operation may be optimal dependent on the size of the conductive walls of the vehicle creating the reflections. Further, for example, in a typical vehicle width is approximately two meters in length, and hence the communication will be in the hundreds of MHz in terms of operation frequency. Further, the low loss depicts a significant improvement over state of the art for achievable loss in current wireless techniques in a conductive vehicle medium.

Further, the intra-vehicular wireless communication within the automotive, maritime, and aircraft sectors. The intra-vehicular wireless communication leverages EQS fields and resonant cavity modes, thus diverging from conventional wireless communication techniques. Moreover, the communication system 102 provides a comprehensive framework for precise conductor placement, allowing for control over electric field properties, thereby influencing communication range and minimizing unintended signal leakage. Further, the Electro Quasi-static field based, or resonant cavity wave mode-based communication may utilize the conductive mediums presented in vehicle or ship chassis to establish a low loss (hence reliable), secure and energy efficient communication. With automotive, aircraft, and ship form factors continuing to decrease, the era where physical tethered communications buses like the Controller Area Network traditionally became a significant challenge. Hence, a need for a secure, low loss, communication channel exists. Furthermore, the signal conductor size does not significantly affect signal loss if the impedance at the frequency of operation is sufficiently low.

Further, a location of the floating ground/reference conductors 210 may be positioned either maximally away from the outer surface of the vehicle chassis to minimize signal loss across the entire frame or closer to the outer surface of the vehicle chassis to excite weaker electric fields within the chassis for enhanced physical security. Further, the floating reference/ground conductors 210 may be place within the conductive frame to establish a highly secure channel. Further, the floating ground/reference conductors 210 may be positioned within the vehicle chassis away from adjacent metals electrically connected to the vehicle chassis to minimize signal loss. Further, the physical device containing the reference/ground conductors 210 inside the vehicle may exhibit bi-phasic or galvanic-like behaviour, resulting in highly localized electric field intensity, making the reference/ground conductors 210 suitable for security-sensitive communication signals. Noting that devices using poor implementations of EQS-based intra-vehicular physical networks that contain the ground inside the vehicle may suffer from radiating geometries or excess field beyond the vehicle chassis, leading to additional signal loss and security vulnerabilities.

Further, the physical device operating in resonant cavity mode excites the vehicle frame as a resonant cavity, and communication efficiency is primarily achieved at discrete frequencies determined by the available modes following from the dispersion relation and conductive chassis dimensions. Further, the communication system 102 may exhibit a voltage channel loss of less than 40 dB for voltage mode communication when the spatial region of interest aligns with a maximum (node) of the standing wave. The device and vehicle's frequencies of resonance may vary depending on the medium of the inside of the vehicle (material of seats, consoles) where effective electric permeability is greater than 1, which typically shifts the resonant frequency lower in most practical vehicle mediums. The device utilizes resonant cavity mode communication while intentionally reducing the transmitted voltage signal to weaken the standing field intensity outside the vehicle chassis. This reduction enhances physical security by limiting the range of signals escaping through vehicle/ship/aircraft imperfections. Encompasses any device that leverages the vehicle chassis to create resonant cavity standing waves for near-field digital communication. The device may employ any EM wave-generating element capable of exciting similar resonant electromagnetic behaviours by incorporating the vehicle's chassis, such as an electrically small antenna via mode conversion.

Furthermore, the communication system 102 utilizes EQS fields or resonant cavity modes for communication between a vehicle and a person wearing an EQS-based wearable device. The communication system 102 facilitates intra-vehicular and inter-vehicular communication when two devices using EQS fields or resonant cavity modes come into proximity with each other. The communication system 102 serves as a relay or bus between two external devices, enabling networked communication using EQS fields or resonant cavity modes.

In an example embodiment, the present system provides wireless communication within vehicles 100 by employing Electro-Quasistatic (EQS) fields and resonant cavity modes. This enables low-loss and secure intra-vehicular communication across automotive, maritime, and aircraft environments by using the conductive vehicle chassis as a communication medium 106. The EQS fields and resonant cavity modes are confined to this chassis, minimizing signal loss and enhancing security.

The source device 104A includes a communication module that converts digital signals into an EQS or electromagnetic field suitable for transmission through the conductive medium 106. At the destination, the signal reception module reconverts the transmitted field back into a digital signal.

The communication system 102 uses signal conductors 208 to generate and propagate EQS fields, and floating ground/reference conductors (also referred herein as floating reference conductors) 210 to complete the communication path. These conductors 208 and 210 are carefully positioned to control electric field properties, impacting the range and security of communication.

The invention uses two main modes. Firstly, in capacitive return path mode, EQS fields are used, where the conductive chassis serves as a forward path while a floating ground completes the return path. This design reduces channel loss compared to traditional RF EM methods, as EQS fields are confined close to the chassis, limiting unintended signal leakage. In a waveguide communication mode, resonant cavity principles are used, where the chassis functions like a resonant cavity, containing electromagnetic waves. At specific frequencies, standing waves form within the chassis, enhancing communication efficiency. This mode's key benefit is a low-loss, secure connection across the entire vehicle frame.

Example Scenarios

Intra-Vehicle Communication: In the first scenario, EQS-based communication allows two devices within a vehicle 100, such as a diagnostic ECU (source) and a sensor node (destination), to communicate using the chassis 106 as a low-loss conductive pathway. If the floating ground 210 is placed outside the vehicle, it provides an unobstructed return path for the signal, allowing efficient long-range communication across the vehicle frame.

Localized Secure Communication: In the second scenario, the floating ground 210 is situated within the vehicle chassis, partially obstructed by other chassis elements. This configuration creates localized high-intensity electric fields suitable for secure communication over shorter distances, such as between adjacent components (e.g., a seat sensor and airbag controller).

In resonant cavity mode, resonant standing waves confined by the chassis walls are used. For instance, the source device 104A could communicate with the vehicle's centre console efficiently, as standing waves at specific frequencies resonate within the vehicle's dimensions. Adjustments are possible to optimize signal location depending on seating or console layouts.

Inter-Vehicle Communication: The communication system 102 also allows interaction between vehicles or with EQS-enabled wearable devices when close to the conductive chassis. This supports applications like vehicle-to-vehicle (V2V) data exchange or person-to-vehicle communication using EQS-based wearable technology. Since EQS fields remain near the conductive surface, the signal is inaccessible at greater distances, enhancing security. Resonant cavity modes further reinforce security by confining high-intensity waves within the chassis and reducing field strength outside it. EQS-based communication and resonant cavity modes show lower channel loss than conventional RF techniques, as EQS fields do not rely on self-sustained wave propagation. The resonant cavity method maintains efficiency by leveraging the conductive chassis' natural reflections.

The system 100 operates across a broad frequency range (0.1 MHz to 10 GHZ) and can adapt based on the vehicle chassis' geometry. As vehicle form factors shrink, this approach offers a compact, efficient alternative to traditional wired networks like the Controller Area Network (CAN).

FIG. 3 illustrates an exemplary comparison between an EQS and a waveguide mode versus a traditional communication medium in vehicle, in accordance with another embodiment of the present disclosure.

According to FIG. 3, a traditional communication mode may include a wired and a wireless network. Further, the wired network may be configured to use Controller Area Network (CAN) network to communicate between physical devices of the vehicle. Further, the wireless network may be configured to use a Radio network to communicate between physical devices of the vehicle. Further, the communication between various electronic devices (like Device A and Device B) may be typically performed using a Controller Area Network (CAN). Further, in the wired network where devices such as, but not limited to ECU, sensors, actuators, and the like may be configured to exchange messages via physical cables. Further, in the wireless network where devices communicate using radio frequency (RF) signals. Further, the wireless communication mode may involve using antennas and transceivers to exchange data between devices without physical cables.

Further, a Capacitive Return Path Mode may include a capacitive coupling. Further, the Capacitive Return Path Mode may be configured to communicate through capacitive coupling between devices. Further, Capacitive Return Path Mode may be configured to confine the forward path of the signal around the vehicle, reducing radiation. Further, in forward path Signals between devices such as Device A and Device B may be confined and transmitted within a well-defined area around the vehicle body. Further, a return path may include return path through capacitance (C Return) between the devices and the ground, ensuring that signal energy stays around the vehicle body.

Further, a waveguide communication mode may include the physical devices communicating with each other in forward waveguide mode and using transmitter setup excitation on chassis through battery. In the waveguide communication mode $\lambda=5$ m. Further, the waveguide communication mode may include a vehicle acting as a waveguide to guide the communication signals between devices. Further, the waveguide communication mode may include waveguide effect. Further, the waveguide effect may include Electromagnetic waves propagating along the cars chassis or metal body, ensuring confinement of the signal within or very close to the vehicle.

Figure 4:
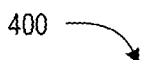
FIG. 4 illustrates an exemplary numerically simulated electric field plots demonstrating fundamental differences between communication system and existing practices, in accordance with an embodiment of the present disclosure.

FIG. 4 illustrates an exemplary numerically simulated electric field plots demonstrating fundamental differences between the communication system and existing practices, in accordance with an embodiment of the present disclosure. According to FIG. 4, simulations of plurality of intra-vehicular communication methods and distribution of the electric field (E-field) across different setups is depicted. Further, each of the plots compares various communication modes in terms of field strength (in V/m) across the vehicle's body or surrounding area, with a colour gradient indicating the electric field's intensity. Further, the simulation plot include results for modes such as, but not limited to, traditional wired communication, capacitive return mode for inside and outside excitation, resonance mode at 82 MHz and 166 MHz, and the like.

Further, the simulation plot depicts the E-field distribution for a traditional wired communication setup using a twisted pair of wires. Further, the simulation in traditional wired communication mode frequency of simulation may be 10 MHz with 1V excitation. Further, a channel loss in traditional wired communication mode may be computed by:

$$RX \text{ voltage} = \text{Effective coupler length} * \text{electric field} \qquad \text{equation (1)}$$

Further, the equation (1) depicts for a small coupler length, such as but not limited to, 0.01 m, the loss could be significant (around 60 dB). Further, the electric field is strongest near the wire, however the field strength in the vehicle is low. Further, the wired communication mode has well-confined electromagnetic emissions, which contributes to lesser susceptibility to interference.

Further, the traditional wireless communication mode may represent the E-field for a wireless communication system using an antenna. Further, the antenna may be configured to operate at 250 MHz with 1V excitation. Further, a field intensity observed may be much higher (up to 6572 V/m) around the vehicle, especially outside the vehicle. Further, the traditional wireless communication mode may include an electromagnetic radiation, both inside and outside the vehicle. The high radiated field strength may lead to interference and signal leakage, making traditional wireless communication less secure than wired or confined communication systems.

Further, the capacitive return mode may include two scenarios, in one of the scenarios, the excitation may be placed outside the vehicle. Further, in another scenario the excitation may be placed inside the vehicle. Further, the inside excitation mode may confine the electric field around the vehicle using capacitive coupling. Further, the inside excitation mode may Operate at 10 MHz with 1V excitation. Further, the field may be confined primarily within the vehicle or very close to the chassis. Further, the maximum E-field may be around 10 V/m, which is much lower than in wireless communication.

Further, the outside excitation mode may be configured to operate at 10 MHz with 1V excitation. Further, the E-field may be confined outside the vehicle body. Maximum E-field is much lower than wireless communication (0.058 V/m). Further, the outside excitation mode may limit the external radiation, ensuring more secure and efficient communication than traditional wireless communication.

Further, the resonance mode at 82 MHz may include frequency tuned to 82 MHz to resonate with the vehicle body. Further, the field generated may be more widely distributed, extending outside the car boundaries. Further, the vehicle may act as a resonant structure at this specific frequency. Further, the vehicle may enhance field strength in specific regions around and inside the vehicle. Further, the resonance modes may be used to enhance the efficiency of intra-vehicular communication at specific frequencies.

Further, the resonance mode at 166 MHz may include much higher E-field, with a maximum of around 15 V/m, indicating stronger resonance at this frequency. Further, the field may radiate around and outside the vehicle due to the higher frequency. Further, the Higher resonance frequency may cause stronger electromagnetic emissions.

Figure 5:
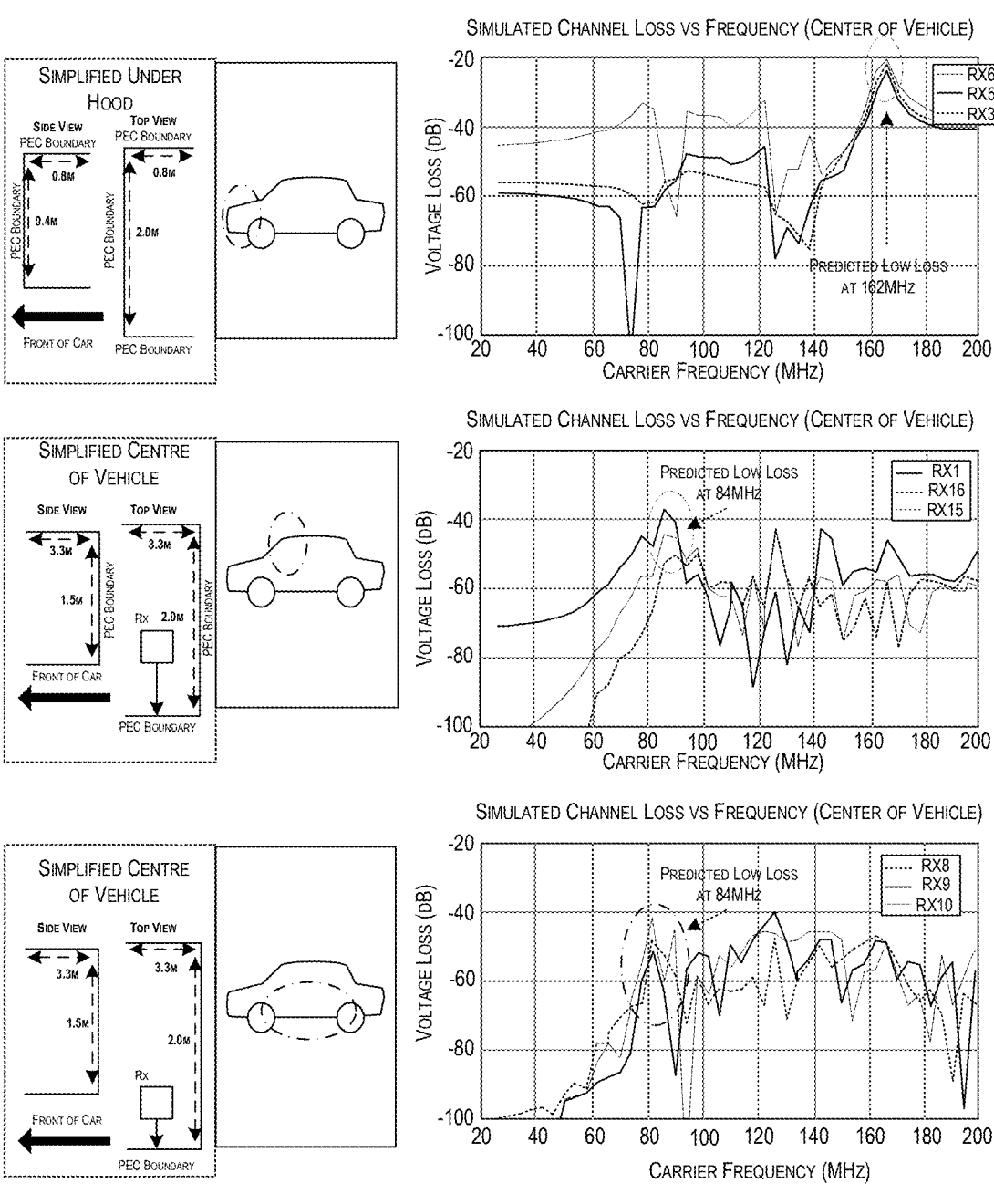
FIG. 5 illustrates an exemplary theoretical modelling and derivation of resonant cavity waveguide mode and corresponding numerical simulations, in accordance with an embodiment of the present disclosure.

FIG. 5 illustrates an exemplary theoretical modelling and derivation of resonant cavity waveguide mode and corresponding numerical simulations, in accordance with an embodiment of the present disclosure. According to FIG. 5, diagrams a, c, and e represent Vehicle Communication Boundaries. Further, the diagram a represent the vehicle communication boundary Under the Hood. Further, the diagram a depicts the Perfect Electric Conductor (PEC) boundary dimensions under the hood (0.8 m×0.4 m). Further, the devices may be installed under the hood for communication might to occur, especially concerning engine controls and sensor data collection. Further, a smaller boundary may depict a more concentrated field, potentially minimizing interference from external sources and enhancing the security of transmitted signals. Further, the diagram c depicts a larger PEC boundary (3.3 m×1.5 m). Further, the larger area encompasses more vital communication channels such as those needed for passenger safety and infotainment systems. Further, diagram c may depict testing signal integrity and loss at the centre of the vehicle possibly to analyze the effectiveness of internal communication systems between internal sensors and devices. Further, the diagram e illustrates a larger PEC boundary (3.3 m×1.5 m) indicative of communication paths related to side sensors or vehicle-to-vehicle interaction. Further, the specified PEC boundary is similar to that in the centre of the vehicle but shifted towards one side.

Further, the diagrams b, d, and f represent Simulated Channel Loss vs. Frequency. Further, the diagram b depicts fluctuating channel losses across a wide range of frequencies. A notable low loss is observed at 162 MHz, which is crucial for optimizing communication efficiency in this region. Further, the specific frequencies such as 162 MHZ for under-hood communications may greatly enhance signal reliability and reduce power consumption. Further, the diagram d illustrates channel loss demonstrating a distinct low at 84 MHZ, a frequency suitable for critical communication flows within the central cabin. Further, utilizing 84 MHz may optimize communication channels for systems involving passenger interaction and control systems, ensuring clarity and reliability. Further, the diagram f illustrates fluctuating channel losses with another low loss peak around 84 MHZ, suggesting that this frequency is efficient for EM transmission or reception at the vehicle's side.

Figure 6:
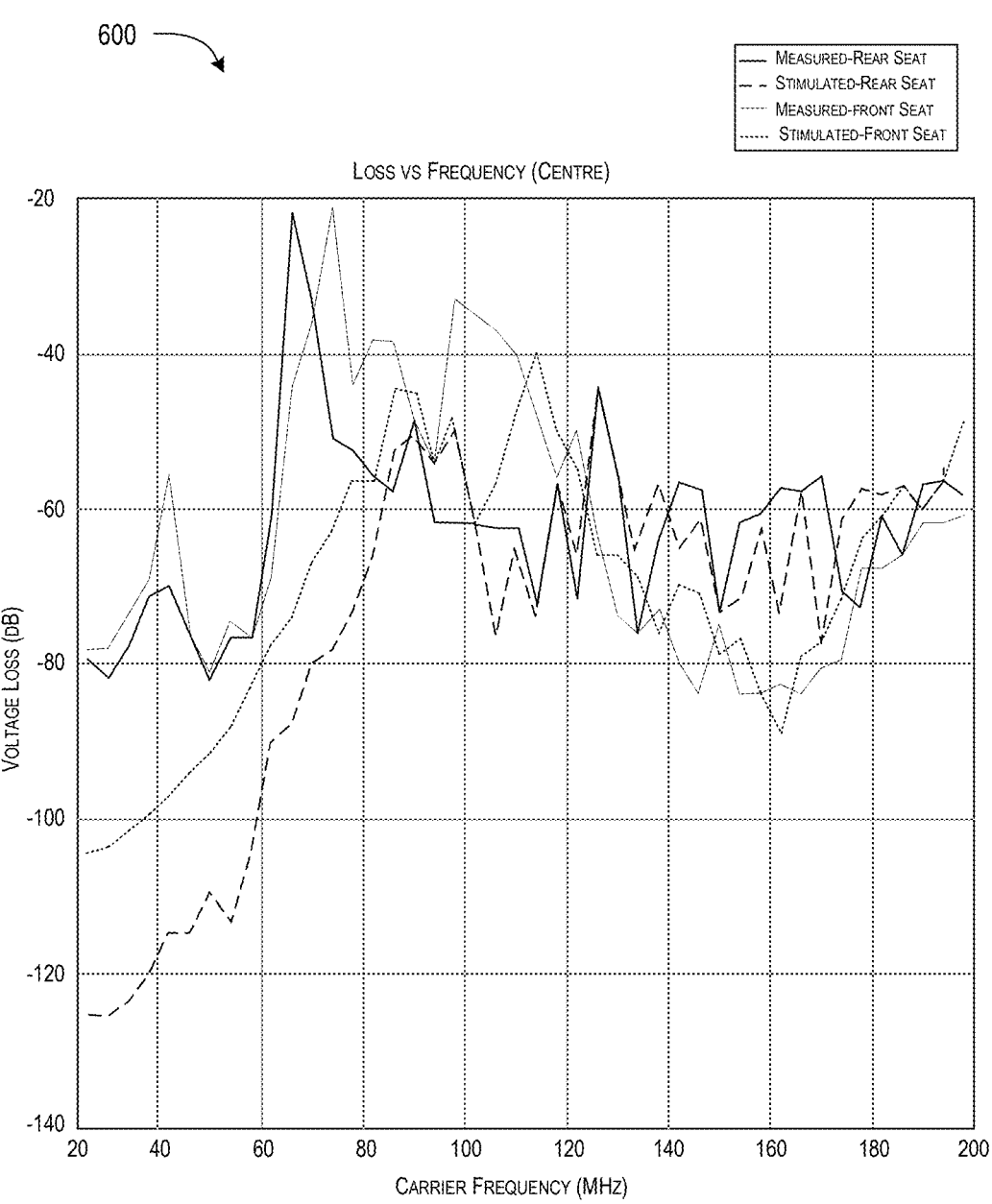
FIG. 6 illustrates an exemplary measurement and simulation of resonant cavity model channel in a commercial grade sports utility vehicle, in accordance with an embodiment of the present disclosure.

FIG. 6 illustrates an exemplary measurement and simulation of resonant cavity model channel in a commercial grade sports utility vehicle, in accordance with an embodiment of the present disclosure. Further, a graph titled "Loss vs Frequency (Centre)" illustrates the relationship between voltage loss (dB) and carrier frequency (MHz) for different seating positions (front and rear seats) in the centre of a vehicle. Further, the data is presented as both measured and simulated values, allowing for comparisons between real-world tests and theoretical models. According to FIG. 6, X-axis represents the frequency of the carrier signal used for communication. Further, the range of frequencies may extend from 0 MHZ to 200 MHz. Further, Y-Axis represents the loss of signal strength (voltage) in decibels. Further, a lower value (more negative) indicates higher signal loss, while values closer to zero indicate better signal retention. Further, the simulation curves of Measured (Rear Seat) may be represented by solid open circles. Further, the simulation curves of Simulated (Rear Scat): Represented by solid dots. Further, the simulation curves of Measured (Front Seat): Represented by dashed open circles. Further, the simulation curves of Simulated (Front Seat): Represented by dashed solid dots.

Further, both rear and front seat measurements depict a drop in voltage loss (i.e., better signal retention) around the 80 MHz to 100 MHz range. Further, at lower frequencies, below 50 MHz, all curves depict a sharp decline, indicating significant voltage loss implying lower frequencies are not ideal for intra-vehicle communication. Further, frequency range between 120 MHz to 160 MHz, the voltage loss increases again. This area might encounter higher interference or signal absorption by vehicle materials, making it less efficient for communication systems. Further, the rear seat (solid and dashed open circles) exhibits slightly better performance (less loss) than the front seat in certain frequency ranges, particularly around 70 MHz. However, as the frequency approaches 160 MHz, the front and rear seat signals show similar performance.

FIGS. 7A-7C illustrate an exemplary circuit diagram representation of EQS in-vehicle galvanic/bi-phasic inspired modes, capacitive return path mode, and resonant cavity Mode, in accordance with an embodiment of the present disclosure. The diagram illustrates three different Excitation Modes for intra-vehicle communication based on Electromagnetic Quasi-Static (EQS) models, highlighting how electrical signals are transmitted within the vehicle for each mode. Further, each mode may be equipped with a corresponding proposed excitation setup (top) and a simplified circuit model (bottom). Further, the Galvanic/Bi-phasic inspired mode may include transmission points (TX Electrode 1, TX GND), receiving points (RX Electrode 1, RX GND), parasitic capacitances formed between the components of the vehicle and air (C_Air). Further, the Galvanic/Bi-phasic inspired mode may include C_Air, C_chassis which represents the capacitance between the chassis and the air, contributing to parasitic paths, Impedances at the receiver (RX) Z_RX, and Impedances at the receiver (RX) and Impedances at the transmitter (TX) Z_TX. Further, C_Tx and C_Rx may represent coupling capacitances between electrodes and the chassis. Further, the Galvanic/Bi-phasic inspired mode may be dedicated to low-frequency signal (<10 MHZ) transmission using capacitive couplings between the vehicle and surrounding air.

Further, the Capacitive Return Path Mode may include the similar circuit components such as described for the Galvanic/Bi-phasic inspired mode. Further, the Capacitive Return Path Mode may include C_ret, TX and C_ret, RX representing the return path capacitances for the transmitter and receiver. Further, the Capacitive Return Path Mode may include Z_chassis1, Z_chassis2 chassis impedance influencing the signal return path. Further, capacitive return path mode may Uses external capacitive coupling paths to enhance signal flow at low frequencies, with parasitic paths outside the vehicle. Further, capacitive return path mode may be dedicated to low-frequency signal (<10 MHZ).

Further, resonant cavity mode may operate at higher frequencies (>80 MHz). Further, at high frequencies, the chassis may behave more like a waveguide, guiding the signal through inductive and resistive elements. Further, the configuration is similar to the other modes, however resonant cavity mode is designed for resonance at higher frequencies. Further, a cavity between the interior components of car and external environment may be used to resonate and amplify the signal. Further, the cavity may be used as a resonator to guide the signal efficiently.

Further, FIG. 7A show the EQS In-Vehicle Excitation mode which is primarily modelled by a galvanic or bi-phasic circuit model. In this case, the return path capacitances do not play a significant role in the communication technique, primarily, the technique is characterized by a differential excitation to the lumped model of the chassis. This generates a highly localized and higher intensity current that is then picked up differentially by the receiver. The coupling is inherently asymmetric since the ground is not in direct contact with the vehicle chassis but could be wired up this way to short out CAR_TX.

FIG. 7B shows the EQS Out-Of-Vehicle Excitation mode which is primarily modelled by a capacitive return path circuit model. Here the primary signal component is flowing through the capacitive return path connection to a common reference/earth. The capacitive return path is formed between the floating ground of the transmitter and receiver devices to a reference or earth potential somewhere outside of the vehicle. This modality of transmission and reception is characterized by single ended devices for transmitter and receivers.

Finally, FIG. 7C displays the circuit model for resonant cavity mode, the simplest circuit model can be summarized as the car chassis acting as a resonator, in this case it is modelled as a basic LC resonator. The frequency of the different modes arises depending on the specific geometry of the vehicle.

FIG. 8 illustrates a process flow diagram of an exemplary a method for providing communication between one or more physical devices of a vehicle using an intra-vehicular network, in accordance with another embodiment of the present disclosure. As illustrated in FIG. 8, the following steps may be implemented. At step 802, the method 800 includes generating, by a plurality of signal conductors 208, an Electro-Quasistatic (EQS) signal from a source device 104A. At step 804, the method 800 includes establishing, by a conductive medium 106, a communication channel between the source device 104A and a destination device 104B. At step 806, the method 800 includes adjusting, by processor 202, the positioning of the signal conductors 208 and the floating reference/ground conductors 210 to select between a wide-range communication mode and a short-range secure communication mode based on the operational requirements of the vehicle. At step 808, the method 800 includes selecting, by the processor 202, a mode of communication between the source device 104A and the destination device 104B based on at least one of a distance between the source device 104A and the destination device 104B, a size of the plurality of signal conductors 208, and a location of the destination device 104B. The modes are selectively activated based on the dimensions of the vehicle chassis to optimize a communication frequency and minimize voltage loss within the vehicle. At step 810, the method 800 includes tuning, by the processor 202, the operational frequency of the resonant cavity modes based on the size of the conductive boundaries within the vehicle chassis to optimize communication performance.

Further, the method 800 include at least one of a capacitive return path mode, and a waveguide communication mode. Further, the method 800 include the waveguide communication mode generating one of an electric field and a magnetic field for forming a standing wave pattern with a sharp field drop-off beyond the conductive medium. Further, the method 800 include the ground plane/floating ground reference 210 is positioned closer to an outer surface of the vehicle chassis. Further, the method 700 include the conductive medium 106 including at least one of resistive, capacitive, and inductive, and combination thereof.

The present invention provides a vehicular data communication device for interaction with Electronic Control Units (ECUs) or vehicular components in automotive, aircraft, or marine environments. This device uses Electro-Quasistatic (EQS) fields coupled to the chassis in a frequency range of 0.1 MHz to 1 GHz or employs resonant cavity modes of the chassis' conductive walls within a frequency range of 0.1 MHz to 10 GHz for data transmission and reception. The EQS field device includes signal conductors electrically connected to the vehicle/ship/aircraft frame and a series of floating ground/reference conductors electrically isolated from the frame.

The vehicle's resonant cavity device generates electric or magnetic fields throughout the vehicle, forming a standing wave pattern with a sharp field drop-off beyond the conductive chassis boundaries, where the electrical short defined by variable-sized signal reference conductors includes, but is not limited to, resistive, capacitive, inductive, or combinations of these impedances. Signal conductor size does not impact signal loss significantly if impedance at the frequency of operation is sufficiently low.

The present vehicular communication system allows the location of floating ground/reference conductors to be positioned either maximally away from the chassis surface to minimize signal loss across the frame or closer to excite weaker electric fields within the chassis, enhancing physical security.

Further, the present vehicular communication system allows floating ground conductors to be placed within the conductive frame to establish a secure channel, and floating ground/reference conductors can be positioned within the chassis away from adjacent metals to minimize signal loss.

The device containing reference/ground conductors inside the vehicle may display bi-phasic or galvanic-like behaviour, resulting in highly localized electric field intensity suitable for security-sensitive communications. The EQS-based intra-vehicular physical networks with internal ground conductors may suffer from radiating geometries or excess field beyond the chassis, causing additional signal loss and security vulnerabilities.

The present vehicular communication system excites the vehicle frame as a resonant cavity, achieving communication efficiency at discrete frequencies determined by available modes, following dispersion relations and chassis dimensions.

The present vehicular communication system shows voltage channel loss under 40 dB for voltage mode communication when the area of interest aligns with a node of the standing wave.

The resonance frequencies vary based on the internal medium of the vehicle, where materials with effective electric permeability greater than 1 typically shift the resonant frequency lower.

The present vehicular communication system uses resonant cavity mode communication while reducing transmitted voltage signals to limit standing field intensity outside the chassis, enhancing physical security by reducing external signal leakage.

Any device can utilize the chassis to create resonant cavity standing waves for near-field digital communication, using any electromagnetic wave-generating element capable of exciting similar resonant behaviours through the chassis.

The present vehicular communication system enables (1) communication between a vehicle and an EQS-based wearable device, (2) intra-vehicular and inter-vehicular communication when two EQS-field or resonant cavity mode devices are near each other, and (3) relay or bus communication between two external devices, leveraging EQS fields or resonant cavity modes.

The invention describes a transceiver device embedded in the physical layer of intra-vehicular networks for automotive, maritime, or aircraft use, allowing wireless communication between ECUs, components, control systems, and sensor networks. It employs EQS fields and resonant cavity modes for communication using unique physics. Optimal placement of signal and floating reference/ground conductors enables selection of electric field properties, affecting communication distance and minimizing leakage. The invention highlights resonant cavity modes, achieved by confining an electromagnetic wave within the chassis' conductive walls.

The invention introduces a transceiver device embedded within the physical layer of intra-vehicular networks for automotive, maritime, and aircraft vehicles, enabling wireless communication between various electronic systems like ECUs, components, control systems, and sensors. Unlike traditional methods, it utilizes EQS fields and resonant cavity modes to achieve communication within the conductive chassis environment.

This method relies on EQS fields, leveraging unique physical properties, distinct from traditional electromagnetic techniques. EQS fields use the conductive chassis as a forward path, with a floating ground/reference creating a return path, achieving lower channel loss. Confined near the chassis surface, EQS signals are secure against access at distances from the chassis.

Conductor placement is crucial for defining the electric field properties governing wireless communication, impacting distance and minimizing leakage. EQS-based communication can occur through two scenarios: a ground plane/floating reference outside the chassis or internal chassis coupling, where fields concentrate near the transmitter and weaken quickly with distance, enhancing security for short-range communication.

By confining electromagnetic waves within the vehicle's conductive walls, the invention establishes resonant cavity modes. These modes allow efficient wireless communication with localized regions of high field intensity. Care is taken in selecting modes based on the receiving device's location, as optimal frequency depends on the conductive walls' dimensions.

This invention enables efficient and secure intra-vehicular communication within automotive, maritime, and aircraft environments, utilizing EQS fields and resonant cavity modes. It allows precise conductor placement, influencing communication range and preventing unintended signal leakage, creating a robust framework for modern vehicular networks.

The present system comprises a transceiver device, implemented at the physical layer of an intra-vehicular network for automotive, maritime, or aircraft vehicles. The device ECUs, vehicle component, control systems, sensor networks or any other electronic on vehicle can communicate wirelessly, as the device leverages Electro Quasistatic (EQS) fields and resonant cavity modes to achieve wireless communication using fundamentally different physics. The present system describes the optimal placement of the sets of signal and floating reference/ground conductors to select the desired electric field properties which affects distance of communication possible and leakage to unintended receivers. In addition, the device highlights resonant cavity modes that are sustained by confining an electromagnetic wave with two conductive walls of the chassis at as a confining boundary.

The present system focuses on the development of a transceiver device to be embedded within the physical layer of intra-vehicular networks. These networks cater to a range of vehicular domains, including but not limited to automotive, maritime, and aircraft vehicles. This transceiver device plays a pivotal role in enabling wireless communication between the multitude of electronic systems that populate these vehicles, including Electronic Control Units (ECUs), vehicle components, control systems, and sensor networks. Unlike conventional wireless communication methods, this invention introduces a shift in physics by exploiting Electro-Quasistatic (EQS) fields and resonant cavity modes as the foundational principles for achieving wireless communication within the conductive vehicular environment. The main requirement for this communication to be possible is that a common conductive medium must exist (as typical in vehicle/ship/aircraft chassis).

Central to the present methodology is the utilization of EQS fields. EQS fields provide an innovative approach to wireless communication, as they rely on a unique set of physical principles, distinguishing them from traditional radio waves and electromagnetic radiation techniques. EQS fields can take advantage of the conductive medium present to achieve significantly low channel loss. The forward path is formed by the conductive chassis itself; the return path is formed using a floating ground/reference intentionally introduced to the device design. The communication methodology enables significant low loss compared to RF EM techniques which rely on self-sustained propagation of electromagnetic waves. These propagating wave-based techniques often falter due to tight packaging of many conductive objects nearby which causes significant losses and reflections. The EQS fields are confined a small distance from the surface of the vehicle chassis. This presents a significant advantage over RF EM techniques as the signal cannot be accessed at a significant distance off the chassis as the electric field intensity is too weak to be picked up even with near theoretically sensitive receivers.

A significant aspect of the invention pertains to the precise placement of sets of signal conductors and floating reference/ground conductors within the vehicle. These conductors play a critical role in controlling the electric field properties that govern wireless communication. By strategically positioning these conductors, the invention enables the selection of specific electric field characteristics, directly impacting the distance over which communication can occur and safeguarding against inadvertent signal leakage.

Specifically, there are two broad categories of EQS-field based communication that have significantly different field distribution. The first is a ground plane/floating ground reference introduced outside of the car chassis. In this scenario, the car chassis can be thought of as a lumped net, of which both devices are connected to with a dead short, in the return path, both devices (transmitter and receiver) connect to the floating ground via return path capacitances. Having the floating grounds outside the vehicle means that there is a clear path between the devices that exists without significant obstruction from the vehicle chassis.

In the second scenario, the device's return path ground is often obstructed by some part of the chassis, hence significant direct coupling between the two grounds is not possible. Hence, higher localized fields are concentrated near the transmitter that die of significant with distance, in this mode communication across the whole vehicle without loss is often difficult, however it is beneficial for short range highly secure communications. The first modality is more suitable for communication across the entire vehicle.

In addition to EQS fields, the present system delves into the realm of resonant cavity modes. By confining electromagnetic waves within the conductive walls of the vehicle chassis, the invention establishes resonant cavity modes. These modes serve as highly efficient wireless communication, further enhancing the performance and reach of the communication system. The downsides are that due to the wave nature of the wave confined within the chassis, localized regions of high field intensity are possible, however so are areas of destructive interference exist as well. The voltage loss in these modes can only be at locations within the vehicle chassis and hence care must be used when selecting which modes depending on the location of the receiving device (i.e., car seat vs centre console). The frequency of operation is optimal dependent on the size of the conductive walls of the vehicle creating the reflections. For example, in a typical vehicle width is approximately two meters in length, and hence the communication will be in the hundreds of MHz in terms of operation frequency. The low loss shows a significant improvement over state of the art for achievable loss in current wireless techniques in a conductive vehicle medium.

The invention represents a solution for intra-vehicular wireless communication within the automotive, maritime, and aerial vehicle sectors. The present system leverages EQS fields and resonant cavity modes, thus diverging from conventional wireless communication techniques. Moreover, the invention provides a comprehensive framework for precise conductor placement, allowing for control over electric field properties, thereby influencing communication range and minimizing unintended signal leakage. These innovations collectively contribute to more efficient and secure communication within vehicular environments, addressing the challenges associated with traditional wireless communication method.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can include hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can include, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A communication system for providing communication between one or more devices of a vehicle using an intra-vehicular network comprising:

a source device of a vehicle, comprising a first communication module, wherein the vehicle comprises a conductive medium, and wherein the first communication module comprises:

a signal conversion unit configured to convert a digital signal associated with the source device into one of an electric field and an electromagnetic wave suitable for transmission via the conductive medium;

a destination device of the vehicle comprising a second communication module, wherein the second communication module comprises:

a signal reception unit configured to receive a transmitted signal via the conductive medium and convert the received signal into the digital signal associated with the destination device;

a conductive medium comprising a metal chassis of the vehicle, wherein the conductive medium enables communication between the first communication module and the second communication module, comprising:

a plurality of signal conductors configured to:

generate an Electro-Quasistatic (EQS) signal from the source device, and forward the generated EQS signal to the destination device via the conductive medium using a EQS field; and a floating reference conductors configured outside the conductive medium to:

receive the forwarded EQS signal from the source device via the EQS field, and establish a communication channel between the source device and the destination device; and a control unit communicatively coupled to the source device and the destination device configured to:

adjust the positioning of the plurality of signal conductors and the floating reference conductors to select between a wide-range communication mode and a short-range secure communication mode based on operational requirements of the vehicle;

select a mode of communication between the source device and the destination device based on at least one of a distance between the source device and the destination device, a size of the plurality of signal conductors, and a location of the destination device, wherein the modes are selectively activated based on the dimensions of the vehicle chassis to optimize a communication frequency and minimize voltage loss within the vehicle; and tune the operational frequency of the modes based on the size of conductive boundaries within a vehicle chassis to optimize communication performance.

2. The communication system of claim 1, wherein the Electro-Quasistatic (EQS) fields coupled to the vehicle chassis is within a frequency range of 0.1 MHz to 1 GHz, and resonant cavity modes formed by the conductive walls of the vehicle chassis are within a frequency range of 0.1 MHz to 10 GHz.

3. The communication system of claim 1, wherein the mode comprises at least one of a capacitive return path mode, and a waveguide communication mode, wherein the modes create localized high-intensity field regions and regions of destructive interference, regions with constructive interference with communication optimized by selecting destination device positions within the vehicle, wherein the mode comprises one of a Electro Quasi-Static (EQS) field mode and an electromagnetic wave (EM) resonant cavity mode for communication based on predefined conditions, wherein the EQS field mode enables low-frequency communication through electric field coupling within the metal chassis, and the resonant cavity mode enables high-frequency communication by exciting electromagnetic waves in the conductive medium, wherein the vehicle chassis acts as a waveguide.

4. The communication system of claim 1, wherein configuration of the floating reference conductors enables one of a bi-phasic and galvanic-like behaviour causing a localized concentration of electric field intensity around the floating reference conductors, wherein the configuration provides a secure communication channel by creating localized regions of field intensity.

5. The communication system of claim 1, wherein communication is established using a voltage mode, wherein when the region of interest aligns with a maximum node of the standing wave a channel voltage loss of less than 40 dB is achieved.

6. The communication system of claim 3, wherein in the EM resonant cavity mode, the control unit is configured to:

generate the electromagnetic waves within the conductive boundaries of the vehicle chassis; and form a standing wave pattern within a cavity defined by vehicle chassis dimensions, wherein a field intensity exhibits sharp drop-off at the conductive boundaries of the vehicle chassis.

7. The communication system of claim 1, wherein the floating reference conductors is positioned closer to an outer surface of the vehicle chassis.

8. The communication system of claim 1, wherein the conductive medium comprises at least one of at least one of a resistive, a capacitive, and an inductive impedances.

9. The communication system of claim 1, wherein in the resonant cavity mode, the control unit is configured to:

excite the vehicle chassis at specific discrete frequencies determined by a dispersion relation of the vehicle chassis and conductive boundaries; and wherein the dimensions of the vehicle chassis define available resonant modes to transmit data at the specific discrete frequencies.

10. The communication system of claim 1, wherein the EQS fields are confined to a specific distance from the surface of the vehicle chassis.

11. The communication system of claim 1, wherein the control unit is configured to maintain a ground isolation via floating ground capacitive coupling.

12. The communication system of claim 1, wherein the modes are established by confining the electromagnetic waves within conductive walls of the vehicle chassis, wherein the vehicle chassis is excited as a resonant cavity, wherein the communication system comprises an electrical antenna configured to induce resonant electromagnetic behaviour within the vehicle chassis.

13. The communication system of claim 1, wherein the positioning of the plurality of signal conductors and the floating reference conductors are optimized to control the electric field characteristics.

14. The communication system of claim 1, wherein the resonance frequency of the source device is adjusted based on the materials present within the vehicle, wherein the materials exhibit an electric permeability greater than 1, thereby causing a shift in the resonance frequency to a lower value to adapt an operating frequency in response to varying electromagnetic properties of an internal environment.

15. A method for providing communication between one or more physical devices of a vehicle using an intra-vehicular network comprising:

generating, by a plurality of signal conductors, an Electro-Quasistatic (EQS) signal from a source device;

establishing, by a conductive medium, a communication channel between the source device and a destination device;

adjusting, by the processor, the positioning of the signal conductors and the floating reference conductors to select between a wide-range communication mode and a short-range secure communication mode based on operational requirements of the vehicle;

selecting, by the processor, a mode of communication between the source device and the destination device based on at least one of a distance between the source device and the destination device, a size of the plurality of signal conductors, and a location of the destination device, wherein the modes are selectively activated based on the dimensions of the vehicle chassis to optimize a communication frequency and minimize voltage loss within the vehicle; and tuning, by the processor, the operational frequency of the resonant cavity modes based on the size of the conductive boundaries within the vehicle chassis to optimize communication performance.

16. The method of claim 15, wherein the mode comprises at least one of a capacitive return path mode, and a waveguide communication mode, wherein the modes create localized high-intensity field regions and regions of destructive interference, regions with constructive interference with communication optimized by selecting destination device positions within the vehicle, wherein the mode comprises one of a Electro Quasi-Static (EQS) field mode and an electromagnetic wave (EM) resonant cavity mode for communication based on predefined conditions, wherein the EQS field mode enables low-frequency communication through electric field coupling within the metal chassis, and the resonant cavity mode enables high-frequency communication by exciting electromagnetic waves in the conductive medium, wherein the vehicle chassis acts as a waveguide.

17. The method of claim 15, wherein in the EM resonant cavity mode, the method comprises:

generating, by the processor, the electromagnetic waves within the conductive boundaries of the vehicle chassis; and forming, by the processor, a standing wave pattern within a cavity defined by vehicle chassis dimensions, wherein a field intensity exhibits sharp drop-off at the conductive boundaries of the vehicle chassis.

18. The method of claim 15, wherein the floating reference conductors is positioned closer to an outer surface of the vehicle chassis.

19. The method of claim 15, wherein the conductive medium comprises at least one of resistive, capacitive, and inductive.

20. A non-transitory computer-readable medium comprising machine-readable instructions that are executable by a processor to:

generate an Electro-Quasistatic (EQS) signal from a source device;

establish a communication channel between the source device and a destination device;

adjust the positioning of the signal conductors and the floating reference/ground conductors to select between a wide-range communication mode and a short-range secure communication mode based on the operational requirements of the vehicle;

select a mode of communication between the source device and the destination device based on at least one of a distance between the source device and the destination device, a size of the plurality of signal conductors, and a location of the destination device, wherein the modes are selectively activated based on the dimensions of the vehicle chassis to optimize a communication frequency and minimize voltage loss within the vehicle; and tune the operational frequency of the resonant cavity modes based on the size of the conductive boundaries within the vehicle chassis to optimize communication performance.

* * * * *